United States Patent

Harrold

[15] 3,683,964
[45] Aug. 15, 1972

[54] PRESSURE COMPENSATING TIMED FLUID FILL SYSTEM

[72] Inventor: Marshall C. Harrold, Dayton, Ohio
[73] Assignee: General Motors Corporation, Detroit, Mich.
[22] Filed: Oct. 26, 1970
[21] Appl. No.: 83,961

[52] U.S. Cl.................................137/624.11, 68/207
[51] Int. Cl..............................................D06f 39/08
[58] Field of Search........137/624.11, 624.15, 624.13, 137/387, 389, 495; 68/207

[56] References Cited

UNITED STATES PATENTS 3,220,228  11/1965  Low.......................137/387 X
2,681,116  6/1954  Treseder........137/624.15 UX

*Primary Examiner*—Alan Cohan
*Attorney*—Frank J. Soucek and Charles R. Engle

[57] ABSTRACT

A pressure compensating timed fill system with particular application to a clothes washing machine wherein an electrically controlled fill valve is energized for a time period dependent upon the prevailing pressure of the fluid being supplied to the fill valve. The pressure of the incoming fluid is applied to a bellows which positions a sliding contact upon a continuously electrically driven drum, the drum comprising varying areas of conductive metal whereby a circuit including a washing machine timer motor controlling an operational cycle is energized in accordance with the pressure of incoming water to the washing tub.

5 Claims, 1 Drawing Figure

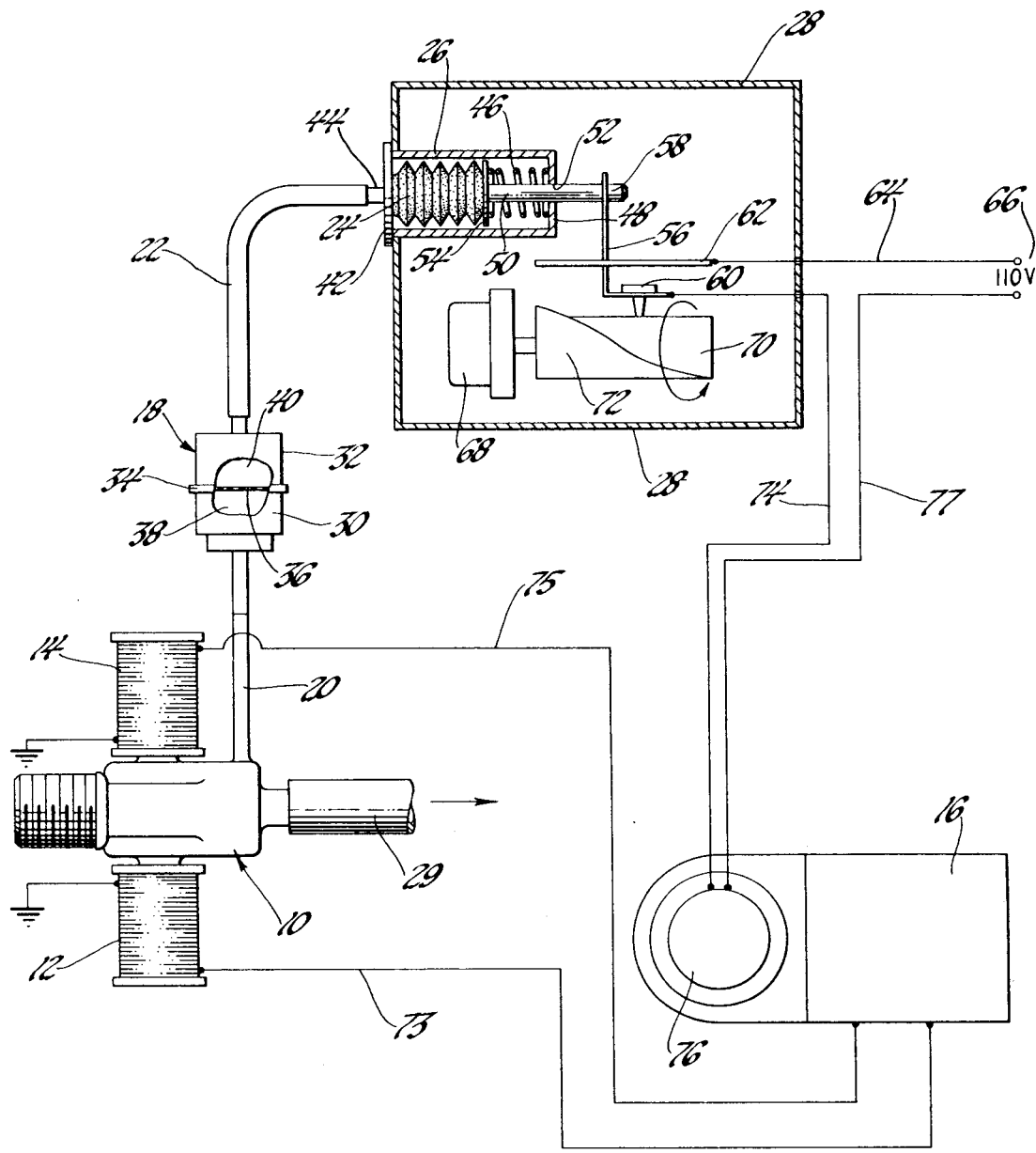

PRESSURE COMPENSATING TIMED FLUID FILL SYSTEM

This invention relates to a fluid fill system having a fill period timed in accordance with the pressure of the supply fluid. More particularly, this invention relates to a water level control incorporating means sensing the prevailing water pressure whereby a washing machine cycle timer motor is energized to assure complete filling of a washing machine prior to initiation of a clothes washing cycle.

Use of domestic clothes washing machines in various geographical areas wherein the pressure of supply water varies through a considerable range has resulted in the requirement of means being provided to assure complete filling of the tub prior to initiation of a washing cycle. It is common practice in this art to utilize means for cutting off the washing machine cycle timer while the machine is being filled and then re-energizing the timer when the water reaches a predetermined level within the washing tub. It is a purpose of this invention to provide an improved water level control system automatically responsive to the pressure of the water being supplied to the appliance. This purpose is accomplished by utilizing a pressure responsive member receiving fluid immediately downstream from an inlet fill valve whereby the pressure responsive member positions a switch contact regulating the time of energization of the washing machine cycle timer motor.

Accordingly, among the objects of this invention is the provision of an automatically actuated pressure compensating timed fill mechanism wherein the washing machine cycle timer motor is de-energized until the washing tub is sufficiently filled.

Another object of this invention is the provision of a switch contact which is actuated in accordance with the pressure of supply water whereby the contact is positioned upon a rotary drum comprising conductive material on a surface so that the period of energization of the timer motor assures complete filling of the washing tub.

A further object of this invention is the provision of a pressure responsive member actuating a switch element, regulating energization of a washing cycle timer, and positioning the latter relative to varying areas of conductive material upon a rotating drum in accordance with water pressure being supplied to the appliance, the pressure responsive member being readily connected by a single conduit into the fluid system and the drum motor and switch element being readily connected in circuit with the cycle timer motor.

With reference now to the drawing, the fill valve assembly 10 is controlled by solenoids 12 and 14 which are in electrical circuitry with a timer device 16, set to provide a predetermined washing cycle. The fill valve 10 is connected to a pressure limiter 18 by conduit 20 and the pressure limiter in turn is connected by conduit 22 to bellows 24 located within housing member 26 disposed within a compensator cabinet 28. A conduit 29 connects the valve with a receptacle or washing tub not shown. The pressure limiter 18 includes a lower casing 30 and an upper casing 32 crimped together at 34 and retaining a diaphragm 36 therebetween. The diaphragm 36 defines a lower chamber 38 and an upper chamber 40 within the pressure limiter 18.

The bellows 24 is retained within housing 26, which is enclosed by cap member 42 having an integral hollow stem 44 receiving one end of the conduit 22. The bellows is biased to a retracted position by a spring 46. The housing 26 is closed at one end by a plate 48. A movable stem 50 extends through an aperture 52 in housing end plate 48, the stem 50 being secured to a plate 54 axially movable within casing 26. The spring 46 engages end plate 48 and movable plate 54.

An arm 56, composed of spring metal, is secured to an extending end 58 of stem 50 and is formed to support a movable switch contact 60 as illustrated in the drawing. The movable switch contact 60 includes spaced conductors, not shown, the conductors being respectively connected with the arm 56 and lead 74. A conductor 62 is attached to the compensator cabinet 28 and is connected by an electrical lead 64 to a source 66. The spring metal electrically conductive arm 56 is in slidable engagement with the conductor 62. An electrical drive motor 68 also is mounted within the compensator cabinet 28 and drives a switch drum 70 having a predetermined area of conductive material 72 secured on the outer surface thereof. The movable switch 60 is continually biased into engagement with the outer surface of switch drum 70 by the spring metal arm 56. It is apparent the circuit through the movable switch 60 is closed when its spaced conductors engage the area of conductive material 72 on the switch drum 70 and likewise the circuit is open when the switch 60 is out of engagement with the conductive material on the drum.

An electrical lead 74 connects the movable switch contact 60 in circuitry with timer motor 76 while lead 77 connects the motor to source 66 so that engagement of the movable contact 60 with the conductive material 72 completes a circuit from the source 66 through the timer motor to energize and rotate the timer thereby advancing the predetermined washing cycle. The timer 16, actuated by the motor 76, is of the usual type including a plurality of cams and switch contacts which are not shown. The motor 76 drives the cams to sequentially close the switch contacts advancing the washing machine cycle. The fill valve actuating solenoids 12 and 14 are in circuit with timer 16 by leads 73 and 75 for energization thereby as required to open and close the valve assembly 10.

In operation the timer 16 energizes either solenoid 12 or 14 to open inlet valve 10 and allow entrance of water through the valve 10 to water fill nozzles mounted within a washing tub or other receptacle. The water pressure is supplied by the conduit 20 to the lower chamber 38 of pressure limiter 18 where it is applied against diaphragm 36. Diaphragm 36 moves to compress the air or other gaseous fluid in upper chamber 40 which in turn expands bellows 24 against the force of spring 46. Expansion of the bellows 24 moves stem 50 and consequently movable contact 60 along the outer surface of switch drum 70, positioning the contact relative to the predetermined pattern of conductive material 72 upon the switch drum. The drive motor 68 continuously rotates the switch drum 70 and engagement of the movable contact 60 with the conductive material 72 regulates the period of energization of timer motor 76. The particular portion of the switch 60, and its spaced conductors, on the switch drum 70 regulates the time of energization of the timer motor 76 through lead 74. During the period of rotation of the drum 70 while the switch 60 is out of engagement with the conductive material 72, the motor 76 is de-energized providing additional filling time in accordance with the prevailing water pressure as the valve 10 remains open. The pattern of conductive material 72 therefore regulates this time period and upon filling of the tub the circuit through the contact 60 is closed as it engages the conductive material 72 energizing motor 76 which then advances the washing cycle to the next phase.

From the above description it is apparent that this invention provides a relatively simple and economical means for regulating the energization of the timer motor 76 while assuring complete filling of the washing tub in accordance with the pressure of the water received in inlet fill valve 10. The components located within cabinet 28, including the bellows 24, switch contact 60, motor 68, drum 70, and conductive material 72 combine to constitute a pressure responsive motor driven percentage timer. The "on" time of this timer is directly related to the prevailing water or fluid inlet pressure. Since this timer regulates the energization of the cycle timer 16, in the case of a washing machine, the "on" time of the cycle timer is controlled to provide a specific quantity of water in the receptacle regardless of the day to day pressure variations in the supply water. The usual washing machine control circuitry is only slightly modified to accomplish this result, namely the lead 64 connects to the conductive bar 62 and a second lead 74 connects the timer motor in circuitry with movable contact 60. Further it is apparent that it is only necessary to slightly modify the inlet valve 10 to accommodate connection of conduit 20 to supply pressure fluid to pressure limiter 18.

While a preferred embodiment of the subject invention has been described for purposes of illustration, the scope of this invention is not intended to be limited thereby except as required by the following appended claims.

What is claimed is:

1. A pressure compensating timed fluid fill system comprising an electrically actuated inlet valve controlling flow of fluid under pressure between a source and a receptacle being filled; means actuating said valve between open and closed positions; fluid pressure responsive means receiving pressure fluid when said inlet valve is open; a timer motor and electrical circuitry controlling the energization of said electrically actuated inlet valve; a movable electric switch contact secured to said fluid pressure responsive means; switch means responsive to the position of said movable contact controlling the energization of said timer motor; and an electrical source connected to said circuitry whereby the period of time said inlet valve remains open is determined by the position of said movable contact relative to said switch means, the movable contact being positioned in response to the inlet fluid pressure applied to said fluid pressure responsive means automatically controlling said timer as a function of the fluid inlet pressure thereby assuring complete filling of the receptacle regardless of variations in inlet fluid pressure.

2. A pressure compensating timed fluid fill system comprising an electrically actuated inlet valve controlling flow of fluid under pressure between a source and a receptacle being filled; means actuating said valve between open and closed positions; fluid pressure responsive means receiving pressure fluid when said inlet valve is open; a movable electric switch contact secured to said fluid pressure responsive means; a switch drum having a predetermined pattern of conductive material on the outer surface thereof; said movable switch contact being in continuous engagement with the outer drum surface; a drive motor rotating said switch drum; and a timer motor and electrical circuitry connecting said switch drum and said movable contact, and said electrically actuated inlet valve; and an electrical source whereby the period of time said inlet valve remains opened is determined by the position of said movable contact upon the conductive material of said switch drum, the movable contact being positioned in response to the inlet fluid pressure applied to said fluid pressure responsive means so that the circuitry to the timer motor is automatically controlled as a function of the inlet fluid pressure thereby assuring complete filling of the receptacle regardless of variations in inlet fluid pressures.

3. A pressure compensating timed fluid fill system comprising a solenoid actuated inlet valve controlling flow of fluid under pressure between a source and a receptacle being filled; a bellows member; a rigid arm secured to said bellows; a movable switch contact secured to said rigid arm; a conduit connected downstream of said inlet valve supplying pressure fluid to said bellows; a switch drum; a predetermined pattern of conductive material secured to the outer surface of said switch drum; a drive motor continuously rotating said switch drum; said movable contact being continuously biased into engagement with the outer surface of said switch drum and engaging varying portions of said conductive material depending upon the position of said movable contact axially of said drum; a timer motor controlling a predetermined operational cycle; and electrical circuitry connecting said timer motor in circuit with said switch drum, said movable contact, and said solenoid valve, whereby said timer motor is energized in accordance with the axial position of said movable contact upon the outer surface of said drum thereby precisely regulating the time said valve is open in accordance with the inlet pressure sensed by said bellows.

4. In a washing machine appliance a pressure compensating timed filled system comprising a solenoid actuated inlet valve controlling inlet flow of water into said washing machine; a conduit connected downstream of said inlet valve; a bellows member; said conduit connecting with said bellows and supplying inlet water pressure thereto; a rigid arm secured to said bellows; a movable contact secured to said rigid arm; a switch drum having a predetermined pattern of conductive material on the outer surface thereof; said movable contact being continuously biased into engagement with the outer surface of said switch drum; an electrical drive motor continually rotating said switch drum when said appliance is in operation; a timer motor regulating the washing cycle of said appliance; and electrical circuitry connecting said timer motor in circuit with said switch drum, said movable contact, and said solenoid valve whereby said timer motor is energized in accordance with inlet water pressure as determined by the position of said movable contact upon said switch drum surface and said predetermined pattern of conductive material thereby assuring complete filling of the washing machine prior to initiation of a washing cycle.

5. A pressure compensating timed fluid fill system comprising an electrically actuated inlet valve controlling flow of fluid under pressure between a source and a receptacle being filled; means actuating said valve between open and closed positions; a cycle timer motor connected in electrical circuitry with and controlling the energization of said electrically actuated inlet valve; and a pressure responsive motor driven percentage timer receiving inlet fluid pressure when said inlet valve is open; said percentage timer regulating the time of energization of said cycle timer motor in response to inlet fluid pressure thereby providing a predetermined quantity of fluid in the receptacle.

* * * * *